(12) United States Patent
Roberts et al.

(10) Patent No.: US 9,060,499 B2
(45) Date of Patent: Jun. 23, 2015

(54) FISHING RIG AND METHOD OF ASSEMBLING SAME

(75) Inventors: Branden A. Roberts, South Padre Island, TX (US); Eleno Salinas, Jr., South Padre Island, TX (US)

(73) Assignee: Logic Lures, Inc., South Padre Island, TX (US)

( * ) Notice: Subject to any disclaimer, the term of this patent is extended or adjusted under 35 U.S.C. 154(b) by 519 days.

(21) Appl. No.: 13/446,947

(22) Filed: Apr. 13, 2012

(65) Prior Publication Data

US 2012/0272564 A1      Nov. 1, 2012

Related U.S. Application Data

(60) Provisional application No. 61/480,173, filed on Apr. 28, 2011.

(51) Int. Cl.
| | |
|---|---|
| *A01K 97/04* | (2006.01) |
| *A01K 85/00* | (2006.01) |
| *A01K 85/01* | (2006.01) |
| *A01K 85/02* | (2006.01) |
| *A01K 91/06* | (2006.01) |

(52) U.S. Cl.
CPC ............. *A01K 85/00* (2013.01); *A01K 85/01* (2013.01); *A01K 85/02* (2013.01); *A01K 91/065* (2013.01)

(58) Field of Classification Search
USPC ............. 43/42.11, 42.14, 42.15, 42.31, 43.15
See application file for complete search history.

(56) References Cited

U.S. PATENT DOCUMENTS

| | | | |
|---|---|---|---|
| 1,144,756 A | 6/1915 | Damsma | |
| 2,238,832 A | 4/1941 | Thoren | |
| 2,609,633 A | 9/1952 | Cracker | |
| 2,636,307 A | 4/1953 | Mason et al. | |
| 2,734,301 A | 2/1956 | Fuqua | |
| 2,794,288 A | 6/1957 | Marshall et al. | |
| 2,850,834 A | 9/1958 | Parrish | |
| 2,986,837 A | 6/1961 | Spugios | |
| 3,426,468 A | 2/1969 | Hinkson | |
| 3,740,891 A | 6/1973 | Rubenstein | |
| 3,854,233 A | 12/1974 | Browning, III | |
| 3,893,255 A | 7/1975 | Hicks | |
| 3,908,298 A | 9/1975 | Strader | |
| 4,221,069 A | 9/1980 | Esses | |
| 4,554,756 A | 11/1985 | Thomas | |
| 4,785,569 A | 11/1988 | Thomas, Jr. | |
| 4,794,721 A * | 1/1989 | Rowe et al. ................ | 43/42.14 |
| 4,848,023 A | 7/1989 | Ryder et al. | |
| 4,920,688 A | 5/1990 | Devereaux et al. | |
| 5,081,786 A | 1/1992 | Cobb | |

(Continued)

FOREIGN PATENT DOCUMENTS

JP       2002-112684 A      4/2002

*Primary Examiner* — Christopher P Ellis
(74) *Attorney, Agent, or Firm* — Howard & Howard Attorneys PLLC

(57) ABSTRACT

A fishing rig for use in catching fish is described herein. The fishing rig includes a leader that extends between a first end and a second end, and a plurality of bait elements that are coupled to the leader. The plurality of bait elements includes a first bait element that is coupled to the leader and is oriented between the leader first end and the leader second end. At least one second bait element is coupled to the leader and oriented downline of the first bait element along the leader such that the first and second bait elements display a schooling-type action to facilitate attracting fish to the fishing rig.

20 Claims, 2 Drawing Sheets

(56) References Cited

U.S. PATENT DOCUMENTS

| | | |
|---|---|---|
| 5,094,026 A | 3/1992 | Correll et al. |
| 5,117,574 A | 6/1992 | Perry |
| 5,144,765 A | 9/1992 | Keeton |
| 5,299,378 A | 4/1994 | Ballard |
| 5,355,616 A | 10/1994 | Parker |
| 5,661,922 A | 9/1997 | Bonomo |
| 5,881,490 A | 3/1999 | Richardson |
| 5,887,381 A * | 3/1999 | Stephenson .................. 43/43.15 |
| 6,041,540 A * | 3/2000 | Potts ............................ 43/42.24 |
| 6,061,948 A | 5/2000 | Boucek |
| 6,185,857 B1 * | 2/2001 | Hnizdor ...................... 43/42.11 |
| 6,230,433 B1 | 5/2001 | Nichols |
| 6,301,822 B1 | 10/2001 | Zernov |
| 7,059,080 B2 * | 6/2006 | Bendel ......................... 43/42.15 |
| 7,117,629 B2 | 10/2006 | Brzozowski |
| 2006/0143973 A1 | 7/2006 | Corbitt, III |
| 2008/0060254 A1 * | 3/2008 | Bloomfield .................. 43/44.84 |
| 2008/0148623 A1 | 6/2008 | Uhrig |
| 2008/0202018 A1 | 8/2008 | Gill |
| 2008/0236022 A1 | 10/2008 | Harrell |
| 2010/0229454 A1 | 9/2010 | Cunningham |
| 2011/0094144 A1 | 4/2011 | Bloomfield |

\* cited by examiner

FISHING RIG AND METHOD OF ASSEMBLING SAME

CROSS-REFERENCE TO RELATED APPLICATIONS

This application claims the benefit of U.S. Provisional Application No. 61/480,173 filed Apr. 28, 2011, the disclosure of which is incorporated herein by reference.

FIELD OF THE INVENTION

The present invention relates generally to a fishing rig, and more particularly, to a fishing rig which provides a more attractive lure for fish.

BACKGROUND OF THE INVENTION

Fishing lures are frequently used in recreational and sport fishing to catch fish. Generally, a fishing lure is attached to a fishing line and is designed to resemble bait, using motion, color, vibration, to attract the fish, causing it to bite the lure, and an attached hook. Fishing lures may include one or more hooks.

A fishing lure with two hooks, where each hook has an associated bait, may be known as a double rig. The bait may be synthetic or live. One type of a fishing lure is known as a jig head. Generally, the jig head includes a weight and an attachment for a hook. The hook may be rigidly fixed to the weight or may be allowed pivot with respect to any eye hook, which is rigidly fixed to the weight. These types of jig head fishing lures do not provide very life-like movement of the lure when in use.

In fishing, it is always desirable to provide features which either give a more life like appearance to the lure, and are more attractive to the fish (resulting in a higher hit frequency). The present invention is aimed at the problem identified above.

SUMMARY OF THE INVENTION

In one aspect of the present invention, a fishing rig for use in catching fish is provided. The fishing rig includes a leader that extends between a first end and a second end, and a plurality of bait elements that are coupled to the leader. The plurality of bait elements includes a first bait element and at least a second bait element. The first bait element is coupled to the leader and oriented between the leader first end and the leader second end. The second bait element is coupled to the leader and oriented downline of the first bait element along the leader such that the first and second bait elements display a schooling-type action to facilitate attracting fish to the fishing rig.

In another aspect of the present invention, a fishing rig for use in catching fish is provided. The fishing rig includes a leader that includes a first end and a second end, a first bait element that is coupled to the leader, and a second bait element that is coupled to the leader. The first bait element is oriented between the leader first end and the leader second end. The second bait element is positioned along the leader such that the first bait element is oriented between the second bait element and the leader first end. An intermediate feature is slideably coupled to the leader for generating an attraction sound to facilitate attracting fish to the fishing rig.

In yet another embodiment, a method of assembling a fishing rig for use in catching fish is provided. The method includes the steps of providing a leader including a first end and a second end, coupling a first bait element to the leader, and coupling a second bait element to the leader. The first bait element is oriented between the leader first end and the leader second end. The second bait element is oriented downline of the first bait element along the leader such that the first and second bait elements display a schooling-type action to facilitate attracting fish to the fishing rig.

BRIEF DESCRIPTION OF THE DRAWINGS

Other advantages of the present invention will be readily appreciated as the same becomes better understood by reference to the following detailed description when considered in connection with the accompanying drawings wherein.

Corresponding reference characters indicate corresponding parts throughout the drawings.

DETAILED DESCRIPTION OF THE INVENTION

Figure 1:
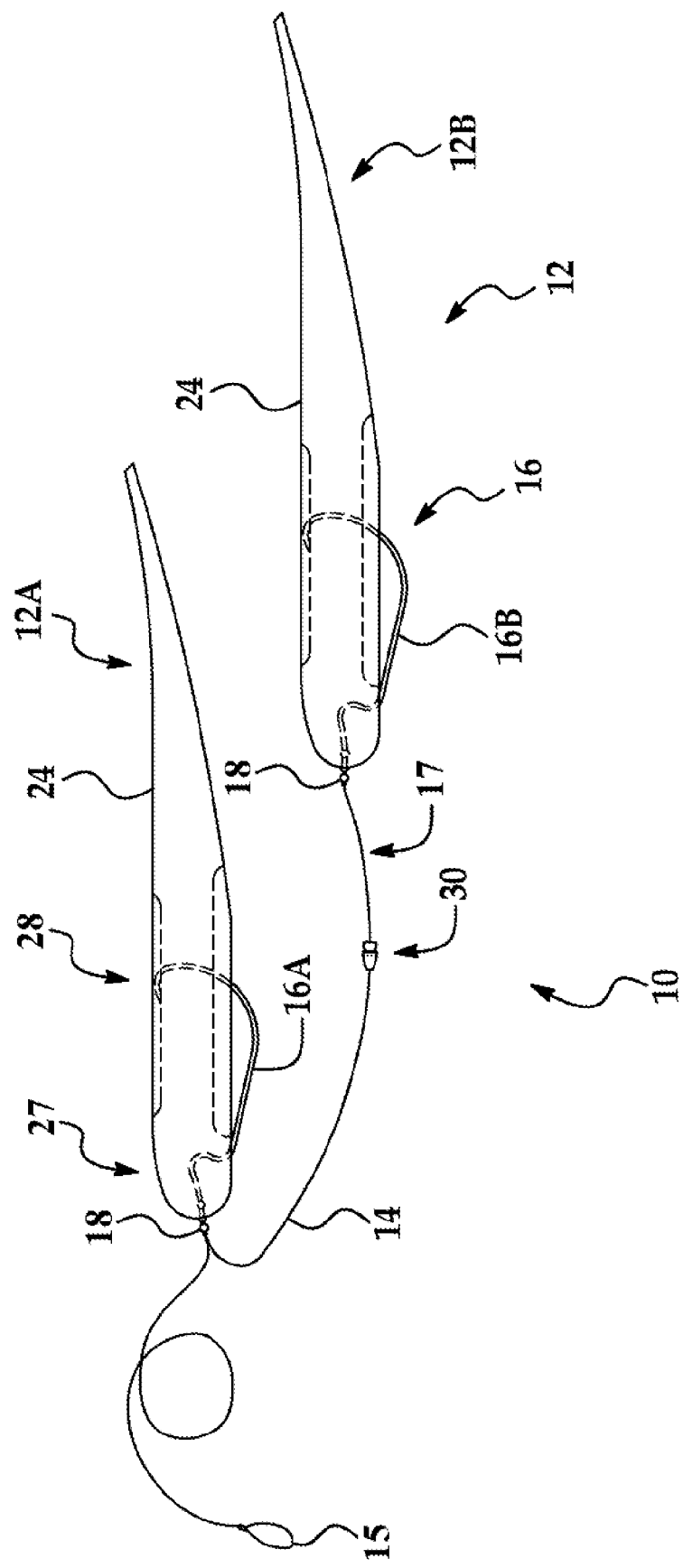
FIG. 1 is an illustration of a fishing rig including first and second bait elements and an intermediate feature having a weight assembly and a bead assembly, according to an embodiment of the present invention.
Figure 2A:
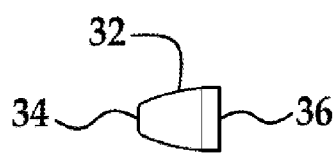
FIG. 2A is a side view of the weight assembly shown in FIG. 1, according to an embodiment of the present invention.
Figure 2B:
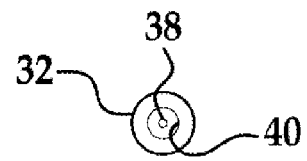
FIG. 2B is a rear view of the weigh assembly shown in FIG. 1, according to an embodiment of the present invention.
Figure 3A:
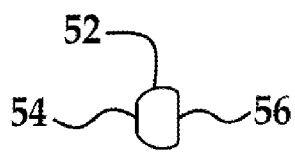
FIG. 3A is a side view of the bead assembly shown of FIG. 1, according to an embodiment of the present invention.
Figure 3B:
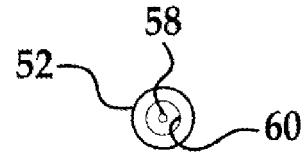
FIG. 3B is a rear view of the bead assembly shown in FIG. 1, according to an embodiment of the present invention.

The exemplary apparatus and methods described herein overcome at least some disadvantages of at least some known fishing rigs by providing a fishing rig that includes a first bait element that is coupled to a leader, and a second bait element that is coupled to the leader and oriented downline from the first bait element along the leader such that the first and second bait elements display a schooling-type action that simulates a plurality of fish swimming in a school. Moreover, the second bait element is spaced a distance from the first bait element along the leader to simulate a weaker, slower, and/or injured fish in the school of fish. In addition, each first and second bait elements include a hook for supporting fish bait, and a connection element coupled between the hook and the leader. The connection element enables each first and second bait element to pivot with respect to the leader to facilitate displaying a simulated swimming action. By providing a fishing rig that displays a plurality of bait elements swimming in a schooling-type action, and simulates a slower and/or injured fish, the fishing rig entices a fish to strike at the fishing rig based on a natural instinct of the fish to strike at weaker, slower, and/or injured fish swimming in a school of fish. As such, a bit frequency of fish during use of the fishing rig is increased, and an enjoyment experienced by a person during fishing is increased.

As used herein, the term "upline" refers to a forward end of a leader such as, for example a fishing line, and the term "downline" refers to an aft end of the leader.

In general, the fishing rig 10 includes first and second bait elements that are coupled to a fishing line. Each bait element includes a fishing hook that is coupled to the fishing line by a connection element. The connection element includes a body and first and second connectors, wherein at least the first connector is pivoting. The first connector of the connection element is associated with the first bait element, and the second bait element is coupled to the fishing line via a palomar knot.

In one embodiment, the fishing rig 10 includes an intermediate feature that is coupled to the fishing line. The intermediate feature includes a hollow weight and a hollow bead. The hollow weight has a first end and a second end. The first end has an internal bore leading to an internal cavern. The internal cavern being open at the second end of the hollow weight. The hollow bead has a first end and a second end. The first end has an internal bore leading to an internal cavern. The internal cavern being open at the second end of the hollow bead. The hollow weight and the hollow bead being freely coupled to the fishing line allowing the hollow weight and hollow bead to move along the fishing line and being arranged such that the second end of the hollow weight is in front of the first end of the hollow bead and at least a portion of the hollow bead able to fit inside the internal cavern of the hollow weight.

With reference to the drawings, and in operation, the present invention provides a fishing rig 10, which may be used for sports fishing. In the illustrated embodiment, the fishing rig 10 includes a plurality of bait elements 12 that are coupled to a leader 14 such as, for example a fishing line, a fishing wire, and/or any suitable leader that enables the fishing rig to function as described herein. The plurality of bait elements 12 includes a first bait element 12A that is coupled to leader 14, and at least one second bait element 12B that is coupled to leader 14. However, it should be noted that the fishing rig 10 may include a single bait element (for certain aspects of the invention) or may include more than two bait elements. The fishing rig 10 is suitable for use in freshwater or saltwater fishing environments and may be used to attract fish of any type, size, and within any environment.

In the illustrated embodiment, the leader 14 extends between a first end 15 and a second end 17. The first end 15 may be adapted to be coupled to a casting rod (not shown) to enable a user to cast the fishing rig 10 into an expected location of fish to enable the fishing rig 10 to attract the fish to the fishing rig 10.

The first bait element 12A is coupled to the leader 14 and is oriented between the first end 15 and the second end 17. The second bait element 12B is coupled to the leader 14 and is oriented downline from the first bait element 12A along the leader 14 such that the first bait element 12A is oriented between the second bait element 12B and the first end 15. In addition, the second bait element 12B is coupled to leader second end 17, and is positioned with respect to the first bait element 12A such that, during use, the first and second bait elements 12A and 12B display a schooling-type action that simulates a plurality of fish swimming in a school to facilitate attracting fish to the fishing rig 10. Moreover, the second bait element 12B is spaced a distance from the first bait element 12A along the leader 14 to simulate a weaker, slower, and/or injured fish in the simulated school of fish to attract a fish to strike at the fishing rig 10 based on a natural instinct of the fish to strike at a weaker and/or injured fish swimming in a school of fish.

In one embodiment, each bait element 12 includes a fishing hook 16 that is coupled to the fishing line 14, and is configured to support a fishing bait 24 from the fishing line 14. In addition, a connection element 18 is coupled between the fishing line 14 and the fishing hook 16 to support the fishing hook 16 and/or the fishing bait 24 from the fishing line 14. The connection element 18 is configured to enable the fishing hook 16 and/or the fishing bait 24 to pivot with respect to the fishing line 14 to enable the fishing bait 24 to display a simulated swimming action. In addition, the connection element 18 is configured to enable the fishing hook 16 to rotate with respect to the fishing line 14 to reduce an undesirable twisting of the fishing line 14 that may cause the fishing line 14 to tangle and reduce the simulated swimming action of the fishing rig 10.

Figure 4A:
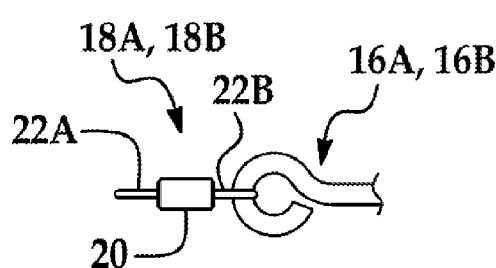
FIG. 4A is a first side view of a connection element that may be used with the fishing rig shown in FIG. 1, according to an embodiment of the present invention.
Figure 4B:
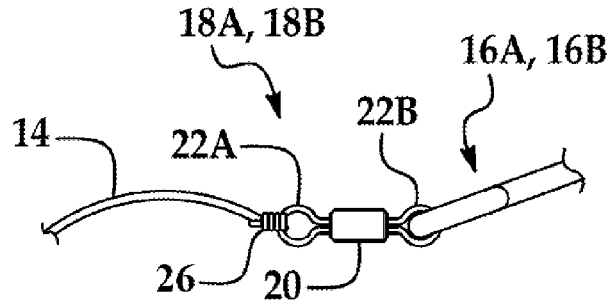
FIG. 4B is a second view of the connection element shown in FIG. 1, according to an embodiment of the present invention.

In the illustrated embodiment, each bait element 12A, 12B includes a fishing hook 16A, 16B coupled to the fishing line 14 by a connection element 18A, 18B. In one embodiment, each bait element 12A, 12B is coupled to the fishing line 14 such that the fishing hook 16A, 16B is adjacent to the fishing line 14. With particular reference to FIGS. 4A and 4B in the illustrated embodiment, each connection element 18A, 18B includes a body 20 and first and second connectors 22A, 22B. In one embodiment, connection element 18 includes a barrel-type swivel assembly. Alternatively, connection element 18 may include a ball-type swivel assembly and/or any type of swivel assembly that enables fishing rig 10 to function as described herein.

In one embodiment, at least the first connector 22A pivots relative to the body 20. Further, at least the first connector 22A of the connection element 18A associated with the first bait element 12A is coupled to the fishing line 14 via a palomar knot 26. With the palomar knot 26, even if the fishing line 14 between the first and second bait elements 12A, 12B is broken, the first bait element 12A will remain securely fastened to the fishing line 14.

In one embodiment, all or some of the connecters 22A, 22B may pivot relative to the associated body 20 (in any combination). The action caused by the pivoting connectors 22A, 22B provide additional movement to the bait elements 12A, 12B to attract fish.

With reference to FIG. 1, in the illustrated embodiment, fishing hook 16 includes a first end, i.e. a connecting end 27, and a second end, i.e. a hook end 28. The connecting end 27 includes a connecting eye (shown in FIG. 4A) that is configured to couple fishing hook 16 to connection element 18. The hook end 28 includes a tapered edge to enable the hook end 28 to penetrate through at least a portion of the fish to catch the fish on the fishing hook 16. In the illustrated embodiment, the fishing hook 16 is a wide-gap worm type hook. Alternatively, fishing hook 16 may be a worm hook, a treble hook, and/or any suitable fishing hook that enables the fishing rig 10 to function as described herein.

In use, bait 24 may be fixed to each bait element 12A, 12B. Moreover, in one embodiment, bait element 12A, 12B is a "weedless" bait element, wherein fishing hook 16 is at least partially inserted into bait 24 to reduce a possibility of weeds being caught on bait element 12 during use. More specifically, at least a portion of hook end 28 is embedded into bait 24 to facilitate reducing an occurrence of the fishing rig 10 being caught on plants and weeds when the fishing rig 10 is cast into shallow water, marshes, and/or deep water including weed beds.

The bait 24 may be live or synthetic. In the illustrated embodiment, the bait 24 are composed of a soft plastic material which compresses when a fish strikes and bites down on the bait 24, exposing the hook 16A, 16B. In one embodiment, the bait 24 is coupled to the fishing hook 16 such that the bait 24 is adjacent to the fishing line 14, as shown in FIG. 1. Alternatively, the bait 24 may be coupled to the fishing line 14 in any suitable manner that enables the fishing rig 10 to function as described herein.

With reference to FIGS. 2A, 2B, 3A, 3B, 5A, 5B, and 5C, fishing rig 10 also includes an intermediate feature 30. The intermediate feature 30 is coupled to the leader 14 to facilitate casting and jigging the fishing rig 10. In addition, the intermediate feature 30 is slideably coupled to the leader 14 and is configured to generate an attraction sound to facilitate attracting fish to the fishing rig 10. In one embodiment, the intermediate feature 30 is oriented between the first bait element 12A and the second bait element 12B along the leader 14. Alternatively, the intermediate feature 30 may be positioned at any location along the fishing line 14 that enables the fishing rig 10 to function as described herein.

In the illustrated embodiment, the intermediate feature 30 includes a weight assembly 32 and a bead assembly 52. The weight assembly 32 and the bead assembly 52 are coupled to, e.g., threaded on, the fishing line 14. The intermediate feature 30 may be coupled to the fishing line 14 as different types of fishing rigs (at different places), including a rig with a single bait element. The weight assembly 32 and the bead assembly 52 are coupled to the fishing line 14 such that they can freely move along at least a portion of the fishing line 14, for example, the portion of the fishing line 14 between the first and second bait elements 12A, 12B. Action of the fishing line 14, e.g., as the fisherman jerks or pulls on, or reels in, the fishing line 14, causes the weight assembly 32 and the bead assembly 52 to strike one another, causing a sound and/or motion which attracts fish. It should be noted that the fishing rig 10 can include two or more weights 32, or two or more beads 52, or any combination thereof.

Figure 5A:
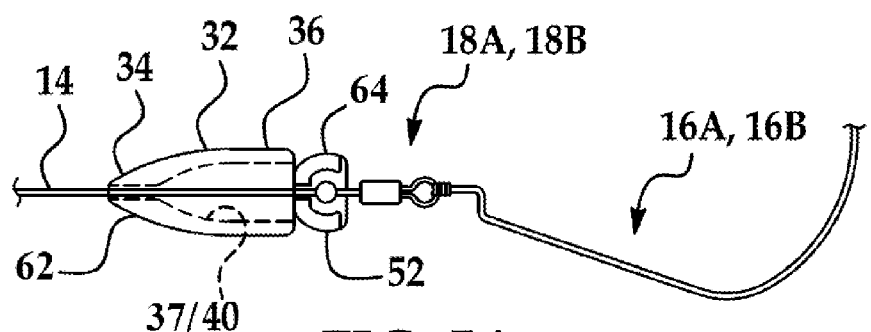
FIG. 5A is a cutaway view of the intermediate feature shown in FIG. 1, according to an embodiment of the present invention.
Figure 5B:
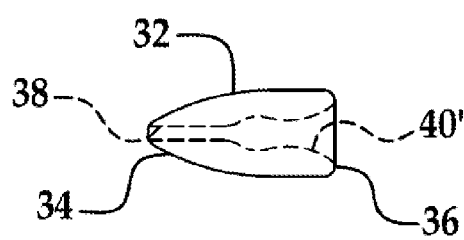
FIG. 5B is a cutaway view of the weight assembly shown in FIG. 1, according to an embodiment of the present invention; and, FIG. 5C is a cutaway view of the bead assembly shown in FIG. 1, according to an embodiment of the present invention.
Figure 5C:
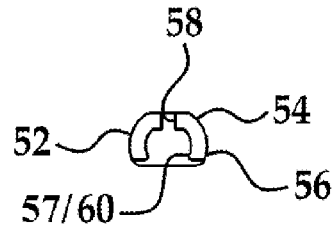

In the illustrated embodiment, the weight assembly 32 has first open end 34 and a second open end 36, and an inner surface 37 that defines an internal cavern 40 that extends between the first open end 34 and the second open end 36. Internal cavern 40 is sized and shaped to receive fishing line 14 therethrough such that weight assembly 32 is slideably coupled to fishing line 14. The first open end 34 includes a first diameter, and the second open end 36 has a second diameter that is different than the first diameter. In one embodiment, the first open end 34 is smaller than the second open end 36. Alternatively, the first open end 34 may be larger than, or approximately equal to, the second open end 36. In addition, the first open end 34 has an internal bore 38 leading to the internal cavern 40. An alternative internal cavern 40' is shown in FIG. 5B. The internal cavern 40, 40' is open at the second end 36 of the hollow weight 32. In one embodiment, the second open end 36 is sized and shaped to receive at least a portion of the bead assembly 52 therein.

In the illustrated embodiment, the bead assembly 52 has a first end 54, a second end 56, and an interior surface 57 that defines an internal cavern 60 therein. The internal cavern 60 is sized and shaped to receive the fishing line 14 therethrough such that the bead assembly 52 is slideably coupled to the fishing line 14. The first end 54 has an internal bore 58 leading to the internal cavern 60. The internal cavern 60 is open at the second end 56 of the hollow bead 52. The hollow weight 32 and the hollow bead 52 being freely coupled to the fishing line 14 allowing the hollow weight 32 and hollow bead 52 to move along the fishing line 14 and being arranged such that the second end 36 of the hollow weight 32 is in front of the first end 54 of the hollow bead 52 and at least a portion of the hollow bead 52 is able to fit inside the internal cavern 40 of the hollow weight 32. Moreover, in one embodiment weight assembly 32 includes an outer surface 62 (shown in FIG. 5A) having a bullet-type shape to facilitate a movement of the weight assembly 32 during use. In addition, bead assembly 52 may include an outer surface 64 (shown in FIG. 5A) having a substantially dome-type shape to facilitate movement of bead assembly 52 during use of the fishing rig 10. In addition, the bead assembly second end 56 may be sized and shaped to receive at least a portion of the connection element 18A, 18B therein. The weight assembly 32 and the bead assembly 52 may be composed of lead or brass or other suitable material.

During use, as the fishing rig 10 moves through water, the weight assembly 32 and bead assembly 52 each move along fishing line 14 such that the weight assembly 32 selectively contacts the bead assembly 52 to generate the attraction sound to facilitate attracting fish to the fishing rig 10.

INDUSTRIAL APPLICABILITY

The present invention provides a new and improved fishing rig which improves the attractibility of the rig to fish, but also protects the fishing line from adverse twisting while avoiding weed catching.

In one embodiment, the fishing rig may consist of at least one lure with a weight. The weight (hollow weight) has a narrow nose, a wider base end, and a bore extending end-to-end through the weight and has a larger opening at the base end and a narrower opening at the nose end. A brass bead (hollow bead) has a round nose, a wide base end, and a bore extending end-to-end through the bead and having a larger opening at the base end and a narrower opening at the nose end. A ball-type swivel may sit inside the bore of the weight with the swivel having two connective elements located at opposite sides of the swivel closest to the nose end and base end of the weight, a fishing line passing through the nose end of the weight and the nose end of the bead, and a fishing hook attached to the connective element closest to the base end of the bead.

The present invention may also be viewed as an improvement in a fishing lure device including a bullet-type weight having an elongated bore extending from end-to-end and tapering at one end, where the narrowest bore diameter is adapted to allow a fishing line to pass through the narrow end of the bore, the bore being large enough to completely house a ball-type swivel, the swivel having two connective elements, one at each end and being adapted to allow the fishing line to be tied, the improvement comprising a hook directly attached to the connective element at the wide end of the bore. This can be configured with or without the brass bead.

When used as a Single Rig or as a Tandem Rig the invention may reduce line twist that occurs upon retrieval of the bait. When used in worm or any artificial bait fishing, the hollowed out worm weight or the brass bead rests atop the worm head without interfering with the operation of the swivel/hook combination. Without the hollowing out of the worm weight and/or brass bead, there would be interference with the operation of the system. The fishing rig allows any bait (not necessarily a worm, plastic or otherwise) attached to the combined swivel/hook, to turn freely, eliminating line twist to be transferred up the line. This also makes for a more natural bait presentation, less stress on the line, reel and rod, more hook-ups, and less loss of fish. Further, at the point of strike, a fish will attempt to throw the hook by turning and twisting. With the free turning swivel/hook combination, the fish does not have the leverage to throw or spit the hook, instead it keeps turning resulting in less hook throwing and more fish being caught. When rigged as a Tandem Rig this creates a realistic, natural swimming action. When fishing using a twitching method the bait and bead slide up and down between the bait creating a clacking sound attraction. The sliding of the weight and bead also allows for a more erratic swimming action. Overall, it is the combination of the Polamer knots, swivel/hook combination, weight, and bead that give this rig the most realistic swimming action on the market to date.

The present invention is adaptable and useable with any type, brand or style of bait, swivel, or hook.

The above-described apparatus and methods overcome at least some disadvantages of at least some known fishing rigs by providing a fishing rig that is configured to simulate fish swimming in a schooling action including a weaker, slower, and/or injured fish to entice a fish to strike at the fishing rig based on natural instincts of the fish to strike at a weaker and/or injured fish. Moreover, the embodiments described herein provide a fishing rig that includes a first bait element that is coupled to a leader, and a second bait element that is coupled to the leader and oriented downline from the first bait element along the leader such that the first and second bait elements display a schooling action that simulates a school of fish. By providing a fishing rig that entices a fish to strike at the fishing rig, the likelihood of catching a fish is increased over known fishing rigs. As such, the enjoyment experienced by a person during fishing is increased.

Exemplary embodiments of a fishing rig and methods of assembling the same are described above in detail. The systems and methods are not limited to the specific embodiments described herein, but rather, components of the apparatus and/or steps of the methods may be utilized independently and separately from other components and/or steps described herein. For example, the methods may also be used in combination with other fishing devices, and are not limited to practice with only the fishing rig as described herein. Rather, the exemplary embodiment can be implemented and utilized in connection with many other fishing applications.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the invention has been described in terms of various specific embodiments, those skilled in the art will recognize that the invention may be practiced with modification within the spirit and scope of the claims.

What is claimed is:

1. A fishing rig for use in catching fish, said fishing rig comprising:
    a leader extending between a first end and a second end;
    a plurality of bait elements coupled to said leader, said plurality of bait elements comprising:
        a first bait element coupled to said leader, said first bait element oriented between the leader first end and the leader second end; and
        at least one second bait element coupled to said leader, said second bait element oriented downline of said first bait element along said leader such that said first and second bait elements display a schooling-type action to facilitate attracting fish to said fishing rig; and
    an intermediate feature coupled to the leader and oriented between the first bait element and the at least one second bait element, the intermediate feature including a weight assembly and a bead assembly, the bead assembly including a first end, a second end, and a bore that extends between the first end and the second end, the second end having a diameter that is larger than the first end and configured to receive at least a portion of the at least one second bait element therein.

2. A fishing rig in accordance with claim 1, wherein at least one of said first bait element and said second bait element comprises:
    a fishing hook, said fishing hook adapted to support a fishing bait from said leader; and
    a connection element coupled between said leader and said fishing hook, said connection element configured to enable said fishing hook to pivot with respect to said leader.

3. A fishing rig in accordance with claim 2, wherein said fishing bait includes a synthetic fish bait, said fishing hook comprising a hook end that is at least partially inserted into the synthetic fish bait, the synthetic fish bait configured to expose said hook end when the synthetic fish bait is contacted by a fish to facilitate catching the fish on the fishing hook.

4. A fishing rig in accordance with claim 2, wherein said connection element comprises a swivel assembly coupled between said leader and said fishing hook to facilitate a pivoting movement of the fishing bait.

5. A fishing rig in accordance with claim 4, the bead assembly bore configured to receive the swivel assembly therein.

6. A fishing rig in accordance with claim 1, wherein said weight assembly is movable with respect to said bead assembly such that said weight assembly selectively contacts said bead assembly to generate an attraction sound to facilitate attracting fish to said fishing rig.

7. A fishing rig in accordance with claim 6, wherein said weight assembly comprises a first open end, a second open end, and an inner surface that defines a bore that extends between the first open end and the second open end, the bore configured to receive said leader therethough, wherein said first open end has a first diameter, said second open end comprises a second diameter that is different than the first diameter.

8. A fishing rig in accordance with claim 7, wherein said weight assembly second open end defines a cavity that is configured to at least partially receive said bead assembly therein.

9. A fishing rig for use in catching fish, said fishing rig comprising:
    a leader comprising a first end and a second end;
    a first bait element coupled to said leader, said first bait element oriented between the leader first end and the leader second end;
    a second bait element coupled to said leader second end such that said first bait element is oriented between said second bait element and said leader first end along said leader; and
    an intermediate feature slideably coupled to said leader for generating an attraction sound to facilitate attracting fish to said fishing rig, the intermediate feature including a weight assembly and a bead assembly, the bead assembly including a first end, a second end, and a bore that extends between the first end and the second end, the second end having a diameter that is larger than the first end and configured to receive at least a portion of the at least one second bait element therein.

10. A fishing rig in accordance with claim 9, wherein said second bait element is substantially similar to said first bait element.

11. A fishing rig in accordance with claim 9, wherein said intermediate feature is oriented between said first bait element and said second bait element.

12. A fishing rig in accordance with claim 9, wherein said weight assembly is movable with respect to said bead assembly such that said weight assembly selectively contacts said bead assembly to generate the attraction sound to facilitate attracting fish to said fishing rig.

13. A fishing rig in accordance with claim 12, wherein said weight assembly comprises a first open end, a second open end, and an inner surface that defines a bore that extends between the first open end and the second open end, the bore configured to receive said leader therethough, wherein said first open end has a first diameter, said second open end has a second diameter that is different than the first diameter.

14. A fishing rig in accordance with claim 13, wherein said weight assembly second open end defines a cavity that is configured to at least partially receive said bead assembly therein.

15. A fishing rig in accordance with claim 9, wherein said first bait element comprises:
a fishing hook, said fishing hook adapted to support fish bait from said leader; and
a connection element coupled between said leader and said fishing hook, said connection element configured to enable said fishing hook to pivot with respect to said leader.

16. A fishing rig in accordance with claim 15, wherein said first bait element further comprises a synthetic fish bait coupled to said fishing hook, said fishing hook comprising a hook end that is at least partially inserted into the synthetic fish bate bait, the synthetic fish bait configured to expose said hook end when the synthetic fish bait is contacted by a fish.

17. A fishing rig in accordance with claim 15, wherein said connection element comprises a swivel assembly coupled between said leader and said fishing hook to facilitate a pivoting movement of the fishing bait with respect to said leader.

18. A method of assembling a fishing rig for use in catching fish, said method comprising the steps of:
providing a leader including a first end and a second end;
coupling a first bait element to the leader, the first bait element oriented between the leader first end and the leader second end;
coupling at least one second bait element to the leader, the second bait element oriented downline of the first bait element along the leader such that the first and second bait elements display a schooling-type action to facilitate attracting fish to the fishing rig; and,
coupling an intermediate feature to the leader for generating an attraction sound to facilitate attracting fish to the fishing rig, the intermediate feature including weight assembly and a bead assembly, the bead assembly including a first end, a second end, and a bore that extends between the first end and the second end, the second end having a diameter that is larger than the first end and configured to receive at least a portion of the at least one second bait element therein.

19. A method in accordance with claim 18, further comprising the steps of:
slideably coupling the weight assembly and the bead assembly to the leader, wherein the weight assembly is movable with respect to the bead assembly such that the weight assembly selectively contacts the bead assembly to generate the attraction sound.

20. A method in accordance with claim 18, further wherein the step of coupling a first bait element to the leader comprises the steps of:
coupling a connection element to the leader; and
coupling a fishing hook to the connection element such that the connection element is between the leader and the fishing hook, wherein the fishing hook is configured to support a fishing bait from the leader, the connection element configured to enable the fishing hook to pivot with respect to the leader.

* * * * *

UNITED STATES PATENT AND TRADEMARK OFFICE
CERTIFICATE OF CORRECTION

| | | |
|---|---|---|
| PATENT NO. | : 9,060,499 B2 | Page 1 of 1 |
| APPLICATION NO. | : 13/446947 | |
| DATED | : June 23, 2015 | |
| INVENTOR(S) | : Branden A. Roberts and Eleno Salinas, Jr. | |

It is certified that error appears in the above-identified patent and that said Letters Patent is hereby corrected as shown below:

In the claims,

Column 9, Line 37: Please delete the words "fish bate bait" and replace with -- fish bait --

Signed and Sealed this
Fifteenth Day of March, 2016

Michelle K. Lee
*Director of the United States Patent and Trademark Office*